(12) United States Patent
Li

(10) Patent No.: US 8,594,592 B2
(45) Date of Patent: Nov. 26, 2013

(54) TRANSMITTER, BASE STATION DEVICE, AND METHOD FOR ALIGNING SIGNAL OUTPUT FROM TRANSMITTER

(75) Inventor: Gang Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 13/503,179

(22) PCT Filed: Oct. 22, 2010

(86) PCT No.: PCT/CN2010/077983
§ 371 (c)(1),
(2), (4) Date: Apr. 20, 2012

(87) PCT Pub. No.: WO2011/050692
PCT Pub. Date: May 5, 2011

(65) Prior Publication Data
US 2012/0202442 A1 Aug. 9, 2012

(30) Foreign Application Priority Data
Oct. 22, 2009 (CN) .......................... 2009 1 0180954

(51) Int. Cl.
*H04B 17/00* (2006.01)
(52) U.S. Cl.
USPC .................. 455/115.2; 455/115.1; 455/127.1; 455/127.2; 455/138; 455/139; 327/236; 327/553
(58) Field of Classification Search
USPC ............. 455/115.2, 115.1, 127.1, 127.2, 138, 455/139; 327/236, 553
See application file for complete search history.

(56) References Cited

U.S. PATENT DOCUMENTS

| 5,041,836 A | 8/1991 | Paschen et al. | |
|---|---|---|---|
| 6,121,826 A * | 9/2000 | Dosho et al. | 327/553 |

(Continued)

FOREIGN PATENT DOCUMENTS

| CN | 1295418 | 5/2001 |
|---|---|---|
| CN | 1985521 | 6/2007 |

(Continued)

OTHER PUBLICATIONS

3GPP TS 25.104 V9.1.0, "3rd Generation Partnership Project; Technical Specification Group Radio Access Network; Base Station (BS) radio transmission and reception (FDD) (Release 9)", Technical Specification, Sep. 2009, pp. 1-83.

(Continued)

*Primary Examiner* — Sanh Phu
(74) *Attorney, Agent, or Firm* — Staas & Halsey LLP

(57) ABSTRACT

A transmitter, a base station device, and a method for aligning a signal output from a transmitter are provided. The transmitter is connected to a first antenna, and the first antenna detects a second test signal transmitted by a second antenna that is connected to another transmitter. The transmitter includes: a signal generating unit, which generates a first test signal; a directional coupler, which receives the first test signal and the second test signal; and a signal processing unit, which measures a timing difference between the first test signal and the second test signal, and uses the measured timing difference to control signal generation, so as to align a signal transmission delay between the two transmitters. Thus, closed-loop detection and an adaptive rectification mechanism for transmission signals of multiple transmitters can be implemented, and accuracy of aligning a signal at each transmitting antenna is improved.

20 Claims, 3 Drawing Sheets

(56) References Cited

U.S. PATENT DOCUMENTS

| | | | |
|---|---|---|---|
| 6,640,112 | B1 | 10/2003 | Lee et al. |
| 6,853,231 | B2* | 2/2005 | Millar ............................ 327/236 |
| 2006/0003712 | A1* | 1/2006 | Schell ......................... 455/115.1 |
| 2008/0095286 | A1 | 4/2008 | Lieuwen |
| 2009/0116572 | A1* | 5/2009 | Fujita et al. ................... 375/267 |

FOREIGN PATENT DOCUMENTS

| | | |
|---|---|---|
| CN | 101060354 A | 10/2007 |
| CN | 101317336 | 12/2008 |
| EP | 1217779 | 6/2002 |
| WO | 01/17156 | 3/2001 |
| WO | 2006/004526 | 1/2006 |
| WO | 2008/057014 | 5/2008 |

OTHER PUBLICATIONS

3GPP TS 25.141 V9.1.0, "$3^{rd}$ Generation Partnership Project; Technical Specification Group Radio Access Network; Base Station (BS) conformance testing (FDD) (Release 9)", Technical Specification, Sep. 2009, pp. 1-192.

3GPP TS 25.211 V9.1.0, "$3^{rd}$ Generation Partnership Project; Technical Specification Group Radio Access Network; Physical channels and mapping of transport channels onto physical (FDD) (Release 9)", Technical Specification, Sep. 2009, pp. 1-56.

International Search Report mailed Jan. 27, 2011 issued in corresponding International Patent Application No. PCT/CN2010/077983.

Written Opinion of the International Searching Authority mailed Jan. 27, 2011 issued in corresponding International Patent Application No. PCT/CN2010/077983.

Chinese Office Action mailed Apr. 15, 2013 in corresponding Chinese Patent Application No. 200910180954.4.

Chinese Office Action issued Aug. 1, 2012 in corresponding Chinese Patent Application No. 200910180954.4.

Extended European Search Report issued Sep. 10, 2012 in corresponding European Patent Application No. 10826055.5.

International Search Report, mailed Jan. 27, 2011, in corresponding International Application No. PCT/CN2010/077983 (4 pp.).

* cited by examiner

TRANSMITTER, BASE STATION DEVICE, AND METHOD FOR ALIGNING SIGNAL OUTPUT FROM TRANSMITTER This application is a National Stage of International Application No. PCT/CN2010/077983, filed on Oct. 22, 2010, which claims priority to Chinese Patent Application No. 200910180954.4, filed on Oct. 22, 2009, both of which are hereby incorporated by reference in their entireties.

FIELD OF THE INVENTION

The embodiments of the present invention relate to the field of wireless communications, and in particular, to a transmitter, a base station device, and a method for aligning a signal output from a transmitter.

BACKGROUND OF THE INVENTION

With configurations such as transmit diversity, MIMO (Multiple Input & Multiple Output), and a smart antenna, a wireless cellular base station requires timing alignment of transmission signals of multiple antennas. For example, as required by WCDMA (Wideband Code Division Multiple Access) protocols 3GPP TS 25.104 and TS 25.141, a signal delay difference between two transmitting antenna ports of a transmitting diversity or MIMO base station does not exceed +/−0.25 Tc (1 Tc is approximately 260 ns). LTE (Long Term Evolution) also imposes a similar requirement.

In practical application, various kinds of FIFO (First Input First Output) apparatuses (such as FIFO in an analog-to-digital converter and FIFO in a digital intermediate-frequency channel chip) on digital channels of a transmitter lead to a difference of a delay every time when a system is powered on. Meanwhile, a group delay of a transmitter analog channel also changes with a frequency, a temperature, and a batch of components. These factors all lead to drift of timing of a transmission signal at each antenna, and a system requirement can hardly be satisfied. Especially, when a multi-antenna system is assembled with multiple different batches of independent modules, such a problem is more obvious.

In a process of implementing the present invention, the inventor of the present invention finds that: In the prior art, it is difficult to observe and measure signals of two transmitters at antennas simultaneously, and it is generally incapable of using a closed-loop mechanism to detect and rectify signal alignment at a transmitting antenna. Therefore, in the prior art, top-down design is used to make delays between different channels consistent with each other. A general technical measure is to reduce FIFO steps on a digital channel as much as possible in design. For a delay change of an analog channel, a large amount of test data is used to generate a data table for compensation. This open-loop solution is difficult to implement, and is hardly accurate.

SUMMARY OF THE INVENTION

An embodiment of the present invention provides a transmitter, a base station device, and a method for aligning a signal output from a transmitter, so that a signal transmission delay between multiple transmitters can be accurately aligned.

An embodiment of the present invention provides a transmitter. The transmitter is connected to a first antenna, and the transmitter includes: a signal generating unit, configured to generate a first test signal; a coupler, configured to receive the first test signal generated by the signal generating unit and a second test signal detected by the first antenna, where the second test signal is transmitted by a second antenna that is connected to another transmitter; and a signal processing unit, configured to measure a timing difference between the first test signal and the second test signal that are received by the coupler, and use the measured timing difference to control generation of a transmission signal, so as to align a signal transmission delay between the transmitter and said another transmitter.

An embodiment of the present invention provides a base station device, including the first antenna, the second antenna, and the transmitter.

An embodiment of the present invention provides a method for aligning a signal output from a transmitter, including: detecting, by a first antenna that is connected to a first transmitter, a second test signal transmitted by a second antenna that is connected to a second transmitter; generating a first test signal; receiving the generated first test signal and the second test signal that is detected by the first antenna; measuring a timing difference between the received first test signal and the received second test signal; and using the measured timing difference to control generation of a transmission signal, so as to align a signal transmission delay between the first transmitter and the second transmitter.

Through the embodiments of the present invention, signals of two transmitters at antennas can be observed and measured simultaneously, and a timing difference between two channels of signals can be obtained. Therefore, closed-loop detection and an adaptive rectification mechanism can be implemented for transmission signals of multiple transmitters, and a signal at each transmitting antenna can be aligned accurately. Moreover, without depending on delay consistency of transmitting channels, in the embodiments of the present invention, a difficulty of designing a transmitting channel is also reduced.

BRIEF DESCRIPTION OF THE DRAWINGS

To describe the technical solutions in the present invention more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without any creative effort.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. Based on the embodiments of the present invention, all other embodiments obtained by those skilled in the art without making any creative effort shall fall within the protection scope of the present invention.

It should be noted that a term "connection" adopted in the following may represent a direct connection, for example, a connection implemented through a cable; and may also represent an indirect direction, for example, a connection implemented through one or more intermediate components. Similarly, terms "receive" and "output" may represent direct receiving/outputting, for example, receiving/outputting through a cable or a wireless interface; and may also represent indirect receiving/outputting, for example, receiving/outputting through one or more intermediate components successively.

Figure 1:
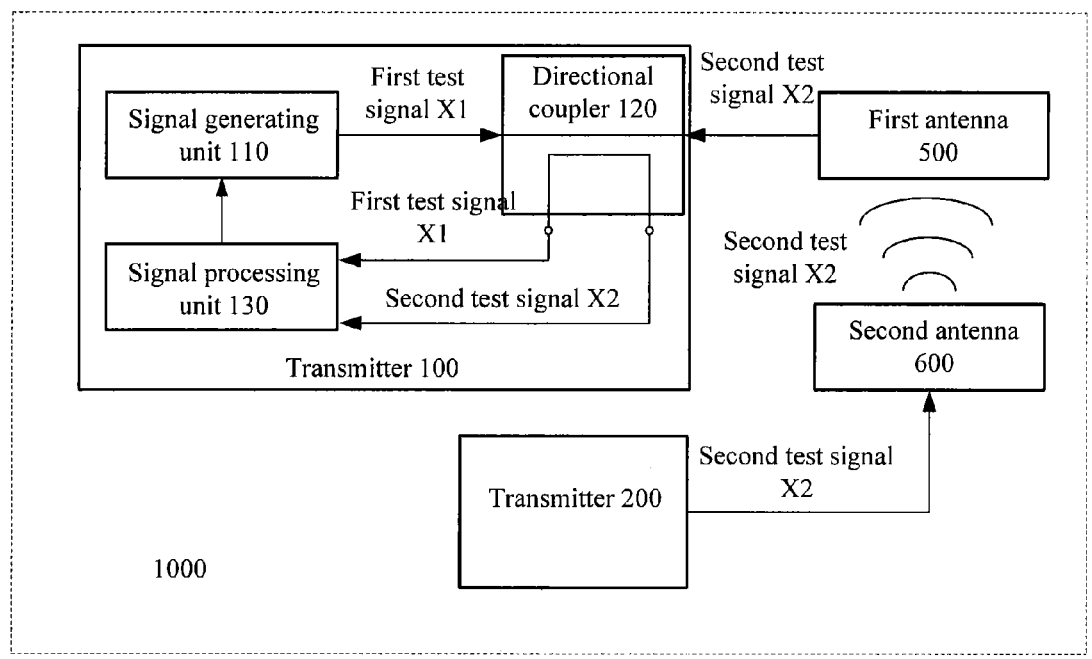
FIG. 1 is a schematic block diagram of a transmitter according to an embodiment of the present invention.

FIG. 1 is a schematic block diagram of a transmitter 100 according to an embodiment of the present invention.

As shown in FIG. 1, the transmitter 100 includes a signal generating unit 110, a directional coupler 120, and a signal processing unit 130.

The transmitter 100 is connected to a first antenna 500, and transmits a generated radio frequency signal from the first antenna 500; or uses the first antenna 500 to receive a radio frequency signal from the outside.

FIG. 1 further shows another transmitter 200 and a second antenna 600 that is connected to the transmitter 200. Structures of the transmitter 200 and the second antenna 600 may be the same as or different from structures of the transmitter 100 and the first antenna 500 respectively.

For the transmitter 100, the signal generating unit 110 generates a first test signal X1, so that the first test signal X1 is transmitted in a direction of the first antenna 500 (this direction is known as a "forward" direction in the following). The directional coupler 120 is disposed on a path between the signal generating unit 110 and the first antenna 500, and can receive the first test signal X1 and output the received first test signal X1 to the signal processing unit 130.

In another aspect, the first antenna 500 detects a second test signal X2 from the second antenna 600, so that the second test signal X2 is transmitted in a direction of the signal generating unit 110 (this direction is known as a "backward" direction in the following). The second test signal X2 is generated by another transmitter 200, and is correlated with the first test signal X1 to some extent.

According to an embodiment of the present invention, the first test signal X1 and the second test signal X2 may include the same test signal with high autocorrelation (for example, a pseudo random sequence code such as an m sequence or a GOLD sequence). Definitely, the test signal may be a dedicated test signal, and may also be a normal service signal. For example, according to 3GPP (3rd Generation Partnership Project) TS25.211, in the case of UMTS (Universal Mobile Telecommunications System) transmit diversity, code elements of PCPICH (Primary Common Pilot Channel) channels that are transmitted by two transmitting antennas are correlated with each other to some extent although the code elements have different signs: one is positive while the other is negative, and therefore, the code elements may also be used as test signals in the embodiments of the present invention. The test signals in the embodiments of the present invention are not limited to the forgoing specific examples, and other signals may be used as test signals as long as the signals are correlated with each other to some extent.

In addition, the two transmitters 100 and 200 may also transmit other service signals simultaneously, but these service signals are in a relationship of frequency division multiplexing, time division multiplexing, or code division multiplexing with the foregoing test signals, without affecting detection for the test signals.

In a direction from the first antenna 500 to the signal generating unit 110 (backward), the directional coupler 120 can further receive the second test signal X2 that is detected by the first antenna 500 from the second antenna 600, and output the received second test signal X2 to the signal processing unit 130.

The directional coupler 120 may use distributed capacitance and distributed inductance that are generated between the directional coupler 120 and an inner conductor of a main feeder cable to measure a forward signal and a backward signal in the main feeder cable, and a principle and structure are known by those skilled in the art and are not detailed here any further.

The signal processing unit 130 measures a timing difference between the two test signals received from the directional coupler 120. According to an embodiment of the present invention, the signal processing unit 130 may use correlation between two test signals to perform a correlation operation and calculate out a timing difference between the two test signals. The correlation operation is described in detail in the following through an example.

After the timing difference between the test signals is obtained, the signal processing unit 130 can use the measured timing difference to control a signal generation operation of the signal generating unit 110, so as to align a signal transmission delay between the transmitter 100 and the transmitter 200. A signal in the signal generation operation is a transmission signal of the transmitter.

In this way, the transmitter 100 in this embodiment of the present invention can observe and measure signals of two transmitters at antennas simultaneously, and obtain a timing difference between two channels of signals.

Two transmitters are taken as an example for description in the forgoing. However, those skilled in the art may understand that a principle in this embodiment of the present invention may be applied to two or more transmitters in a similar way. Therefore, with the transmitter 100 in this embodiment of the present invention, closed-loop detection and an adaptive rectification mechanism for transmission signals of multiple transmitters can be implemented, and a signal at each transmitting antenna can be aligned accurately.

In addition, this embodiment of the present invention does not depend on delay consistency of transmitting channels. For example, when different batches of independent modules are assembled, in this embodiment of the present invention, delay consistency between different transmitting channels does not need to be ensured or compensated beforehand. Therefore, a difficulty of designing a transmitting channel is reduced.

In addition, according to an embodiment of the present invention, the transmitters 100 and 200 and the antennas 500 and 600 make up a base station device 1000 (a dashed box in FIG. 1).

According to an embodiment of the present invention, the first antenna 500 and the second antenna 600 may make up a dual-polarization antenna of the base station device 1000. In other words, the dual-polarization antenna includes the first antenna 500 and the second antenna 600 inside. A polarization direction of the antenna 500 is perpendicular to a polarization direction of the antenna 600, and therefore, the antenna is called a dual-polarization antenna. In this case, two independent transmitters 100 and 200 make up a MIMO system with dual transmitting channels, and the two transmitters 100 and 200 may share a set of dual-polarization antenna.

In practice, a certain coupling degree always exists between the two antennas 500 and 600 of the dual-polarization antenna. That is, one antenna (such as the first antenna 500) may receive a part of signals transmitted by the other antenna (such as the second antenna 600). In this case, the first antenna 500 may use the coupling degree to detect the second test signal X2 transmitted by the second antenna 600, so that using one transmitter to observe a signal of another transmitter is implemented.

In the foregoing embodiment, a closed-loop detection mechanism for transmission signals of two transmitters is also implemented, and a signal at each transmitting antenna can be aligned accurately. Meanwhile, the foregoing embodiment is also similarly applicable to two or more transmitters.

The following describes a specific application configuration for implementing this embodiment of the present invention. It should be understand that, the following description is only intended for those skilled in the art to understand a principle of this embodiment of the present invention more clearly, but is not intended to limit the scope of the present invention.

Figure 2:
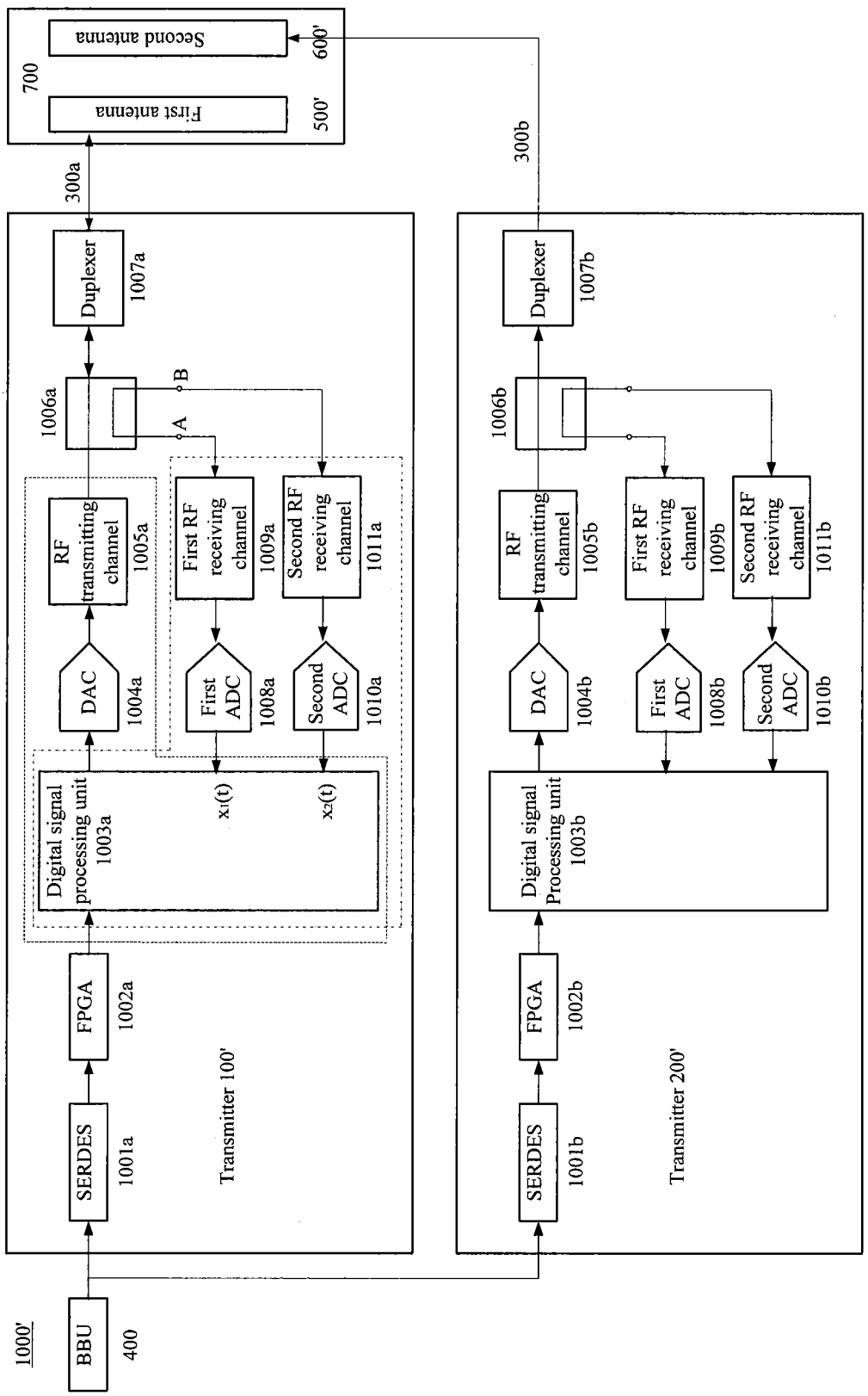
FIG. 2 is a structural block diagram of a specific configuration of a transmitter according to an embodiment of the present invention.

FIG. 2 is a structural block diagram of a specific configuration of a transmitter according to an embodiment of the present invention. In FIG. 2, features corresponding to FIG. 1 are represented by the same or similar accompanying drawing marks. The transmitter in FIG. 2 is applied to a base station device 1000'. The base station device 1000' includes two transmitters 100' and 200', and a dual-polarization antenna 700.

As shown in FIG. 2, the transmitter 100' includes a SERDES (serial deserializer) 1001a, an FPGA (field programmable gate array) 1002a, a digital signal processing unit 1003a, a DAC (Digital-Analog Converter) 1004a, an RF (Radio Frequency) transmitting channel 1005a, a directional coupler 1006a, a duplexer 1007a, a first ADC (Analog-Digital Converter) 1008a, a first RF receiving channel 1009a, a second ADC 1010a, and a second RF receiving channel 1011a.

An internal configuration of the transmitter 200' is similar to that of the transmitter 100'. Therefore, a similar accompanying drawing mark is used to represent a corresponding component. That is, the transmitter 200' includes a SERDES 1001b, an FPGA 1002b, a digital signal processing unit 1003b, a DAC (Digital-Analog Converter) 1004b, an RF transmitting channel 1005b, a directional coupler 1006b, a duplexer 1007b, a first ADC (Analog-Digital Converter) 1008b, a first RF receiving channel 1009b, a second ADC 1010b, and a second RF receiving channel 1011b.

It should be noted that the internal configuration of the transmitter 200' may be different from that of the transmitter 100'. Using the same internal configuration is only a possible embodiment of the present invention, and is not intended to limit the scope of the present invention.

In addition, as shown in FIG. 2, the dual-polarization antenna 700 is made up of a first antenna 500' and a second antenna 600'. The transmitter 100' is connected to the first antenna 500' of the dual-polarization antenna 700 through a first feeder cable 300a. The transmitter 200' is connected to the second antenna 600' of the dual-polarization antenna 700 through a second feeder cable 300b.

The transmitters 100' and 200' receive the same input signal from a BBU (Base Band Unit) 400, and the signal is processed by respective SERDESs and FPGAs of the transmitters 100' and 200' successively. The input signal is a signal with auto correlation to some extent. For example, the input signal may be, but is not limited to, a pseudo random sequence code such as the forgoing m sequence or GOLD sequence. The SERDESs 1001a and 1001b and the FPGAs 1002a and 1002b may adopt devices that are known in the prior art, and operations of the devices are hardly related to the technical solutions in the embodiments of the present invention and are not detailed here any further. In addition, FIG. 2 shows that the transmitters 100' and 200' receive input signals from the BBU 400 in parallel. Persons skilled in the art are clearly aware that the transmitters 100' and 200' may also receive input signals from the BBU 400 serially. A connection mode and a signal receiving mode between the transmitters 100' and 200' and the BBU 400 are not intended to limit the scope of the present invention.

The digital signal processing unit 1003a, the DAC 1004a, and the RF transmitting channel 1005a may be corresponding to the signal generating unit 110 (as shown in a dashed box in FIG. 2) in FIG. 1. Specifically, the digital signal processing unit 1300a generates a first test signal X1 (in a digital form) based on the input signal that is received from the BBU 400, where the first test signal X1 needs to be transmitted by the first antenna 500'; and outputs the first test signal X1 in the digital form to the DAC 1004a. The DAC 1004a converts the first test signal X1[[a]] in the digital form into a first test signal X1[[a]] in an analog form, and an RF transmitting channel 1005a (for example, which has functions such as modulation, filtering, and amplification) outputs the first test signal in the analog form to the dual-polarization antenna. When the first test signal X1 passes through the directional coupler 1006a, the directional coupler 1006a detects and receives the first test signal X1.

In another aspect, the digital signal processing unit 1003b, the DAC 1004b, and the RF transmitting channel 1005b of the transmitter 200' perform similar processing to generate a second test signal X2, where the second test signal X2 is output by the duplexer 1007b and the second feeder cable 300b to the second antenna 600' of the dual-polarization antenna 700. The second antenna 600' transmits the second test signal X2. Because the first test signal X1 and the second test signal X2 are generated based on the same input signal with auto correlation, the two test signals are correlated with each other to some extent.

At this time, the first antenna 500' of the dual-polarization antenna 700 uses a degree of coupling with the second antenna 600' to detect the second test signal X2. In this way, in a backward direction of the transmitter 100', the first antenna 500' outputs the second test signal X2 (in an analog form) to the directional coupler 1006a through the duplexer 1007a.

When the second test signal X2 passes through the directional coupler 1006a, the directional coupler 1006a detects and receives the second test signal X2.

The directional coupler 1006a may be corresponding to the directional coupler 120 in FIG. 1. Specifically, the directional coupler 1006a has two output ends: a forward output end A and a backward output end B. The forward output end A outputs the first test signal X1 that is received by the directional coupler 1006a, and the backward output end B outputs the second test signal X2 that is received by the directional coupler 1006a.

The digital signal processing unit 1003a, the first ADC 1008a, the first RF receiving channel 1009a, the second ADC 1010a, and the second RF receiving channel 1011a may be corresponding to the signal processing unit 130 (as show in the dotted and dashed box in FIG. 2) in FIG. 1. Specifically, the first RF receiving channel 1009a (for example, which has functions such as filtering, demodulation, and amplification) receives the first test signal X1 that is output from the forward output end A of the directional coupler 1006a. Afterward, the first ADC 1008*a* converts the first test signal X1 in the analog form into a first test signal X1 in a digital form, and outputs the first test signal X1 in the digital form to the digital signal processing unit 1003*a*. It is assumed that the digital form of the first test signal X1 that arrives at the digital signal processing unit 1003*a* at this time is $x_1(t)$, where t represents time.

In another aspect, the second RF receiving channel 1011*a* (for example, which has functions such as filtering, demodulation, and amplification) receives the second test signal X2 that is output from the backward output end B of the directional coupler 1006*a*. Afterward, the second ADC 1010*a* converts the second test signal X2 in the analog form into a second test signal X2 in a digital form, and outputs the second test signal X2 in the digital form to the digital signal processing unit 1003*a*. It is assumed that the digital form of the second test signal X2 that arrives at the digital signal processing unit 1003*a* at this time is $x_2(t)$, where t represents time.

The digital signal processing unit 1003*a* performs the following correlation operation on two channels of signals $x_1(t)$ and $x_2(t)$:

$$G(\tau)=\int_{t_0}^{t_0+T} x_1(t) \times x_2(t-\tau) dt, \text{ where}$$

$t_0$ is initial time of a correlation operation interval, and T is a length of the correlation operation interval. Values of $t_0$ and T may be set according to a requirement of specific application. If a value of T is greater, accuracy of an operation result is higher, but operation time is longer. A value of τ is changed continuously. For example, the value of τ starts from 0 and increases progressively according to a certain step length, and a corresponding $G(\tau)$ is calculated. It is assumed that the $G(\tau)$ reaches a maximum value when τ=τ1, and therefore, τ1 is a timing difference between the two channels of signals $x_1(t)$ and $x_2(t)$.

In this embodiment, it should be ensured that the first ADC 1008*a* and the second ADC 1010*a* have basically the same delay. In this way, the timing difference between the signals $x_1(t)$ and $x_2(t)$ that arrive at the digital signal processing unit 1003*a* is almost the same as a timing difference between the two test signals X1 and X2 that are received by the directional coupler 1006*a*. In this case, it can be seen from FIG. 2 that, the signal $x_2(t)$ traverses two more radio frequency feeder cables 300*a* and 300*b* and the duplexer 1007*a* of the transmitter 100' than the signal $x_1(t)$ does. A delay of the duplexer is generally smaller, and may be ignored. Generally, a delay of the feeder cable is also smaller and may be ignored in some cases. In the case that the delay of the feeder cable cannot be ignored, the delay of the feeder cable and/or the delay of the duplexer is generally known, or can be measured and obtained easily in advance. When the digital signal processing unit 1003*a* calculates the timing difference between the two channels of signals $x_1(t)$ and $x_2(t)$, compensation may be made for a delay of the first feeder cable 300*a* and a delay of the second feeder cable 300*b* (and/or the duplexer 1007*a*). For example, this part of delay may be deducted to obtain a timing difference between the two channels of signals at an antenna port.

If the delay of the feeder cable or the delay of the duplexer is unknown or is not convenient to be measured, compensation may also be made for the delay. With the same principle in the forgoing, the second antenna 600' may also use a degree of coupling with the first antenna 600' to detect the first test signal X1 from the first antenna 500'. Through similar processing, the digital signal processing unit 1003*b* of the transmitter 200' calculates a timing difference between two channels of digital signals that arrive at the digital signal processing unit 1003*b*. It is assumed that the timing difference is τ2. Therefore, Δτ=(τ1−τ2)/2 is a timing difference of two channels of signals at an antenna after the delay of the feeder cable (and/or the duplexer) is offset.

In the case that the transmitters 100' and 200' share a digital processing part (such as a central processing unit, which is not illustrated in FIG. 2), the forgoing τ1, τ2, and Δτ may be calculated by the central processing unit. If the transmitter 100' is independent of the transmitter 200', the timing differences τ1 and τ2 that are calculated by the two transmitters independently may be exchanged with each other through an upper-layer common component (such as the BBU 400), and respective digital signal processing units of the two transmitters calculate the forgoing Δτ. Alternatively, a dedicated channel for exchanging data may be set up between the two transmitters.

After the timing difference between the two channels of signals is obtained, the digital signal processing unit 1003*a* or 1003*b* may control their respective signal generation operations according to the timing difference, so as to align a signal transmission delay between the transmitter 100' and the transmitter 200'.

In this way, the transmitter in this embodiment of the present invention can observe and measure signals of two transmitters at antennas simultaneously, and obtain a timing difference of the signals of the two transmitters. Moreover, the transmitter according to this embodiment of the present invention implements closed-loop detection and an adaptive rectification mechanism for transmission signals of multiple transmitters, and can align a signal at each transmitting antenna accurately. In addition, without depending on delay consistency of transmitting channels, the transmitter in this embodiment of the present invention further reduces a difficulty of designing a transmitting channel.

Although specific embodiments of the present invention are described in the forgoing, the present invention is not limited to such specific embodiments. Those skilled in the art easily make various modifications and variations based on the description about the embodiments of the present invention. Such modifications and variations shall all fall within the scope of the present invention.

For example, the foregoing embodiments are mainly directed to the configuration of two transmitters, and are only intended to explain principles of the embodiments of the present invention better, but are not intended to limit the scope of the present invention. Persons skilled in the art easily understand that the embodiments of the present invention may be extended to transmission signal alignment of more transmitters. In this way, a configuration of multiple transmitters shall still fall within the scope of the present invention.

In addition, in the forgoing embodiment, the two transmitters adopting a dual-polarization antenna and a certain coupling degree existing between the two antennas are described, but the embodiment of the present invention are not limited to the forgoing description. For example, even if two independent antennas are adopted, the technical solution in this embodiment of the present invention is also applicable as long as the two antennas are not far away from each other, an enough coupling degree is ensured, and one antenna can detect a signal that is transmitted by the other antenna. Such an antenna configuration shall still fall within the scope of the present invention.

In each forgoing embodiment, the directional coupler at the output end of the transmitter is a coupler that integrates a forward coupler with a backward coupler, but the embodiments of the present invention are not limited to the forgoing directional coupler. The forward coupler and the backward coupler may also be independent from each other, and receive and output a forward signal and a backward signal respectively.

In the embodiment in FIG. 2, the directional coupler is disposed between the RF transmitting channel and the duplexer, but the embodiments of the present invention are not limited to the forgoing description. Because a duplexer delay is very small and is generally ignorable, the directional coupler may also be disposed between the duplexer and the antenna.

In the embodiment in FIG. 2, two independent channels (the first ADC 1008[[A]]a, the first RF receiving channel 1009a, the second ADC 1010a, and the second RF receiving channel 1011a) are adopted to receive a forward signal and a backward signal respectively, but the embodiments of the present invention are not limited to the forgoing description. The forward signal and the backward signal may share the same receiving channel. That is, only one ADC and one RF receiving channel are adopted. In this embodiment, two ADC components that have basically the same delay do not need to be used. In this case, an RF switch is used to switch between the forward output end and the backward output end of the directional coupler in turn. A delay of the RF switch is smaller and generally ignorable. The digital signal processing unit calculates a first timing difference between the forward signal and an internal reference signal of the transmitter and a second timing difference between the backward signal and the reference signal, and therefore, the first timing difference and the second timing difference are used to calculate a timing difference between the forward signal and the backward signal indirectly.

Figure 3:
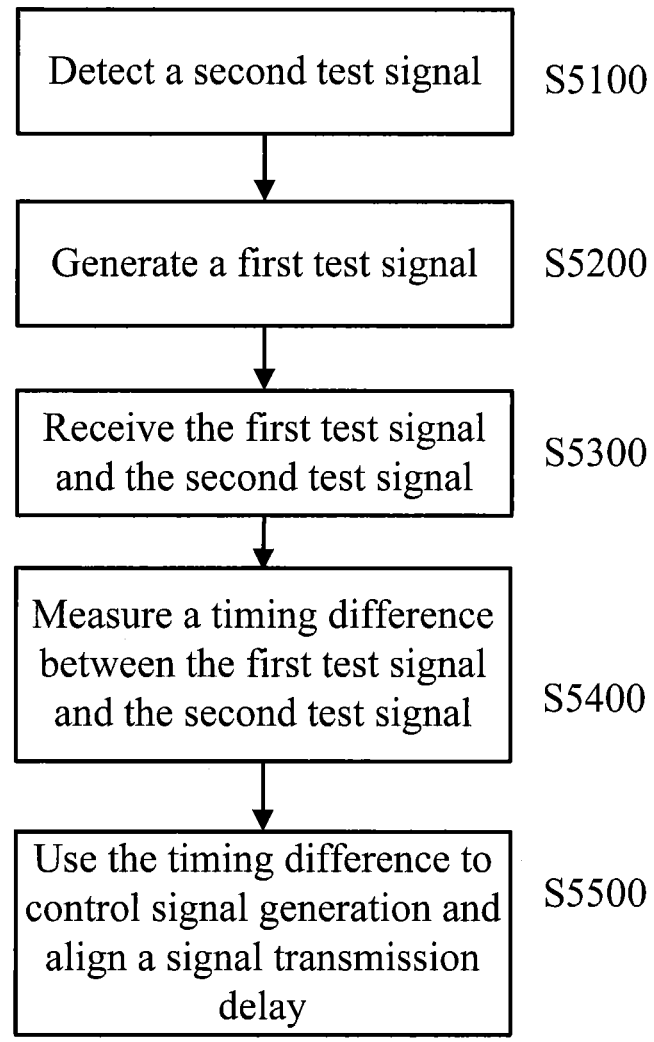
FIG. 3 is a flowchart of a method for aligning a signal output from a transmitter according to an embodiment of the present invention.

A method for aligning a signal output from a transmitter according to an embodiment of the present invention is described in the following. FIG. 3 is a flowchart of a method 5000 for aligning a signal output from a transmitter according to an embodiment of the present invention. The method 5000 may be executed by each forgoing transmitter. The transmitter in FIG. 1 is taken as an example for description in the following.

In S5100 of the method 5000, a first antenna (see FIG. 1) connected to a first transmitter 100 detects a second test signal X2 transmitted by a second antenna 600 (see FIG. 1) that is connected to a second transmitter 200. The first antenna 500 may use a degree of coupling with the second antenna 600 to detect a signal transmitted by the second antenna 600.

In S5200, a first test signal X1 is generated. For example, a signal generating unit 110 of the first transmitter 100 may perform an operation of generating the signal. The first test signal X1 is correlated with the second test signal X2. For example, the two signals include the same test signal with strong auto correlation.

In S5300, the generated first test signal X1 and the second test signal X2 that is detected by the first antenna 500 are received. For example, S5300 may be executed by a directional coupler 120 of the first transmitter 100.

In S5400, a timing difference between the received first test signal X1 and the received second test signal X2 is measured. For example, S5400 may be executed by a signal processing unit 130 of the first transmitter 100.

As described in the forgoing, in S5400, the signal processing unit 130 may measure the timing difference between the first test signal and the second test signal through a correlation operation. Alternatively, for example, when the same receiving channel is used to receive a forward signal and a backward signal of the directional coupler, a timing difference between one test signal and an internal reference signal of the transmitter and a timing difference between the other test signal and the internal reference signal are measured respectively, and then the timing difference between the two test signals is calculated indirectly. That is, S5400 includes: measuring a first timing difference between the first test signal and a reference signal; measuring a second timing difference between the second test signal and the reference signal; and using the first timing difference and the second timing difference to calculate the timing difference between the first test signal and the second test signal.

In S5500, the measured timing difference is used to control generation of a signal, so as to align a signal transmission delay between the first transmitter 100 and the second transmitter 200. For example, the signal processing unit 130 may use the measured timing difference to control a signal generation operation of the signal generating unit 110, so as to align the signal transmission delay between the two transmitters.

In this way, with the method 5000 for aligning a signal output from a transmitter according to this embodiment of the present invention, signals of two transmitters at antennas can be observed and measured simultaneously, and a timing difference between two channels of signals is obtained. Moreover, with the method 5000 according to this embodiment of the present invention, closed-loop detection and an adaptive rectification mechanism for transmission signals of multiple transmitters are implemented, and a signal at each transmitting antenna can be aligned accurately. In addition, without depending on delay consistency of transmitting channels, with the method 5000 according to this embodiment of the present invention, a difficulty of designing a transmitting channel is also reduced.

It should be noted that each step of the method 5000 does not necessarily be executed in a shown order. Some of the steps may be executed in a reverse order or in parallel. For example, the first antenna 500 may detect the second test signal X2 (S5100) at the same time when the first test signal X1 is generated (S5200), or S5200 may be performed first, and then S5100 is performed.

The method 5000 may further include processing performed by each forgoing base station device, transmitter and other components, which is not described again in order to avoid repetition.

Persons of ordinary skill in the art may realize that, units and algorithm steps described in the embodiments disclosed in this specification can be implemented by electronic hardware, computer software, or a combination of the two. To describe interchangeability of hardware and software clearly, components and steps of the embodiments are generally described according to functions in the forgoing description. Whether these functions are implemented by hardware or software depends upon specific applications and design constraints of the technical solutions. Persons skilled in the art may implement the described functions by using different methods for each specific application, but such implementation should not be construed as a departure from the scope of the present information.

The steps of a method or an algorithm described in the embodiments disclosed in this specification may be implemented by hardware, a software module executed by a processor, or a combination of the two. The software module may be disposed in a random access memory (RAM), flash memory, read-only memory (ROM), electrically programmable ROM, electrically erasable programmable ROM, register, hard disk, removable disk, CD-ROM, or any other form of storage medium known in the art.

Although some embodiments of the present invention are shown and described, those skilled in the art should understand that various modifications may be made to these embodiments without departing from the spirit and scope of the present invention. These modifications shall fall within the scope of the present invention.

What is claimed is:

1. A transmitter, connected to a first antenna, and comprising:
   a signal generating unit, configured to generate a first test signal;
   a coupler, configured to receive the first test signal generated by the signal generating unit and a second test signal detected by the first antenna, wherein the second test signal is transmitted by a second antenna that is connected to another transmitter; and
   a signal processing unit, configured to measure a timing difference between the first test signal and the second test signal that are received by the coupler, and use the measured timing difference to control generation of a transmission signal, so as to align a signal transmission delay between the transmitter and said another transmitter.

2. The transmitter according to claim 1, wherein:
   the first test signal is correlated with the second test signal; and the signal processing unit is specifically configured to:
   measuring the timing difference between the first test signal and the second test signal through a correlation operation.

3. The transmitter according to claim 1, wherein:
   the signal processing unit is further configured to measure a first timing difference between the first test signal and a reference signal; measure a second timing difference between the second test signal and the reference signal; and use the first timing difference and the second timing difference to calculate the timing difference between the first test signal and the second test signal.

4. The transmitter according to claim 1, wherein:
   the transmitter is connected to the first antenna through a first feeder cable, and said another transmitter is connected to the second antenna through a second feeder cable; and
   the signal processing unit is further configured to compensate for a delay of the first feeder cable and the second feeder cable in the process that the signal processing unit measures the timing difference between the first test signal and the second test signal that are received by the coupler.

5. The transmitter according to claim 1, wherein:
   the first antenna and the second antenna make up a dual-polarization antenna.

6. The transmitter according to claim 1, wherein:
   the using the measured timing difference to control generation of the signal comprises:
   using the measured timing difference to control generation of a transmission signal of the signal generating unit.

7. The transmitter according to claim 1, wherein:
   the first test signal and/or the second test signal is a dedicated test signal or a normal service signal.

8. The transmitter according to claim 7, wherein:
   the directional coupler is disposed between a transmitting channel of the transmitter and a duplexer, or disposed between the duplexer of the transmitter and the first antenna.

9. The transmitter according to claim 7, wherein:
   the signal processing unit comprises a receiving channel, which is configured to receive the first test signal and the second test signal; and the transmitter further comprises a radio frequency switch, which is configured to switch between the forward output end and the backward output end of the directional coupler in turn.

10. The transmitter according to claim 1, wherein:
    the coupler is a directional coupler, and a forward output end of the directional coupler is configured to output the first test signal, and a backward output end of the directional coupler is configured to output the second test signal.

11. The transmitter according to claim 1, wherein:
    the signal processing unit comprises two independent channels, which are configured to receive the first test signal and the second test signal respectively.

12. A base station device, comprising:
    a first antenna, a second antenna, and a first transmitter connected to the first antenna, wherein the first transmitter comprising:
    a first signal generating unit, configured to generate a first test signal;
    a first coupler, configured to receive the first test signal generated by the first signal generating unit and a second test signal detected by the first antenna, wherein the second test signal is transmitted by the second antenna that is connected to a second transmitter; and
    a first signal processing unit, configured to measure a first timing difference between the first test signal and the second test signal that are received by the first coupler, and use the measured timing difference to control generation of a transmission signal, so as to align a signal transmission delay between the first transmitter and the second transmitter.

13. The base station device according to claim 12, further comprising the second transmitter connected to the second antenna, wherein:
    the second transmitter comprising:
    a second signal generating unit, configured to generate the second test signal;
    a second coupler, configured to receive the second test signal generated by the second signal generating unit and the first test signal detected by the second antenna, wherein the first test signal is transmitted by the first antenna that is connected to the first transmitter; and
    a second signal processing unit, configured to measure a second timing difference between the first test signal and the second test signal that are received by the second coupler; and
    wherein
    the first signal processing unit is further configured to obtain a difference value between the first timing difference measured by the first signal processing unit and the second timing difference measured by the second signal processing unit, divide the obtained difference value by 2 to obtain a value, and use the value to control generation of the transmission signal.

14. The base station device according to claim 13, wherein:
    the first antenna detects the second test signal transmitted by the second antenna through coupling between the first antenna and the second antenna; and the second antenna detects the first test signal transmitted by the first antenna through coupling between the first antenna and the second antenna.

15. The base station device according to claim 12, wherein the first antenna and the second antenna make up a dual-polarization antenna.

16. The base station device according to claim 12, wherein:
the first test signal is correlated with the second test signal; and the first signal processing unit is specifically configured to:
measuring the timing difference between the first test signal and the second test signal through a correlation operation.

17. A method for aligning a signal output from a transmitter comprising:
detecting, by a base station device, through a first antenna connected to a first transmitter, a second test signal transmitted by a second antenna that is connected to a second transmitter;
generating, by the base station device, a first test signal;
measuring, by the base station device, a timing difference between the generated first test signal and the detected second test signal; and
using, by the base station device, the measured timing difference to control generation of a transmission signal, so as to align a signal transmission delay between the first transmitter and the second transmitter.

18. The method according to claim 17, wherein:
the measuring the timing difference between the first test signal and the second test signal comprises:
measuring a first timing difference between the first test signal and a reference signal;
measuring a second timing difference between the second test signal and the reference signal; and
using the first timing difference and the second timing difference to calculate the timing difference between the first test signal and the second test signal.

19. The method according to claim 17, wherein:
the first test signal is correlated with the second test signal, and the measuring the timing difference between the first test signal and the second test signal comprises:
measuring the timing difference between the first test signal and the second test signal through a correlation operation.

20. The method according to claim 19, wherein:
the first test signal and/or the second test signal is a dedicated test signal or a normal service signal.

* * * * *